United States Patent
Horst et al.

(10) Patent No.: US 6,997,969 B1
(45) Date of Patent: Feb. 14, 2006

(54) FILTER MATERIAL AND METHOD

(75) Inventors: Dirk Dieter Hans Ter Horst, Caracas (VE); Hans Joachim Lippold, Berlin (DE)

(73) Assignee: LPD Technologies, Miami, FL (US)

( * ) Notice: Subject to any disclaimer, the term of this patent is extended or adjusted under 35 U.S.C. 154(b) by 183 days.

(21) Appl. No.: 10/622,054

(22) Filed: Jul. 17, 2003

(51) Int. Cl.
*B01D 39/16* (2006.01)

(52) U.S. Cl. .......................... 55/528; 55/495; 55/521; 55/DIG. 5; 210/483; 210/493.5; 264/280; 264/282; 264/285; 264/DIG. 48

(58) Field of Classification Search ............. 55/495, 55/521, 527, 528, DIG. 5; 428/141, 147; 210/483, 493.1, 493.5, 497.1; 264/280, 282, 264/284, 285, 293, DIG. 48
See application file for complete search history.

(56) References Cited

U.S. PATENT DOCUMENTS 2,464,301 A * 3/1949 Francis, Jr. ................. 264/284
4,178,161 A * 12/1979 Rudner et al. ................ 55/521
4,268,290 A * 5/1981 Barrington .................... 55/521
4,784,892 A * 11/1988 Storey et al. .................. 55/527
5,053,131 A * 10/1991 Lippold ............... 264/DIG. 48
5,098,767 A * 3/1992 Linnersten ............... 210/493.5
5,288,298 A * 2/1994 Aston ........................... 55/486
5,316,676 A * 5/1994 Drori ....................... 210/497.1
5,609,761 A * 3/1997 Franz ............................ 55/521
5,888,262 A * 3/1999 Kahler ......................... 55/521
6,273,938 B1 * 8/2001 Fanselow et al. ........ 55/DIG. 5
6,824,581 B1 * 11/2004 Tate et al. ..................... 55/521

FOREIGN PATENT DOCUMENTS

| EP | 0 831 161 A1 | * | 3/1998 |
| JP | 5-131104 | * | 5/1993 |

* cited by examiner

*Primary Examiner*—Jason M. Greene
(74) *Attorney, Agent, or Firm*—Bachman & LaPointe, P.C.

(57) ABSTRACT

A filter is provided including a synthetic filter material formed into a filter structure and having at least one embossment having a depth of at least about 1.5 mm, preferably at least about 4.0 mm, and more preferably at least about 5.0 mm. A method for making the filter is also provided, and results in a filter which is formed without rupture of the material.

18 Claims, 1 Drawing Sheet

FILTER MATERIAL AND METHOD

BACKGROUND OF THE INVENTION

The invention relates to air filtration and, more specifically, to a filter material and method for making a filter whereby an improved filter structure can be provided.

Conventional filters are made from micro-fiberglass material which can be made into useful filter structures for air conditioning and purification units, vehicles, industrial installations and the like. Such filters can be subjected to significant stresses during use, and the filter can readily be damaged by this stress.

One way in which the filters are attempted to be strengthened is to provide the filters with pleats, embossments or dimples which serve to strengthen the material. Unfortunately, the conventional micro-fiberglass material places a limitation upon the depth to which the material can be dimpled or embossed. Attempts to emboss such material to a depth greater than about 2 mm results in failure of the material. However deeper embossings can be used to provide a more efficient and reliable structure.

Based upon the foregoing, it is clear that the need remains for an improved filter structure with improved reliability and structural strength.

It is therefore the primary object of the present invention to provide such a filter structure.

It is a further object of the present invention to provide a method for making a filter which has increased structural strength.

Other objects and advantages of the present invention will appear hereinbelow.

SUMMARY OF THE INVENTION

According to the invention, the foregoing objects and advantages have been readily attained.

According to the invention, a filter is provided which comprises a synthetic filter material formed into a filter structure and having at least one embossment having a depth of at least about 1.5 mm.

The synthetic material advantageously allows for deeper embossings than can conventionally be obtained, and thereby for the resulting improved filter structures.

In further accordance with the invention, a method is provided for forming a filter, which method comprises the steps of: providing a synthetic filter material; forming at least one embossment into said material, said embossment having a depth of at least about 1.5 mm, so as to provide an embossed synthetic material; and forming said embossed synthetic material into said filter.

BRIEF DESCRIPTION OF THE DRAWINGS

A detailed description of preferred embodiments of the present invention follows, with reference to the attached drawings, wherein.

DETAILED DESCRIPTION

The invention relates to air filtration and, more particularly, to a filter structure having material which allows for deeper embossing or dimples than can conventionally be obtained. This deeper embossing allows for a structurally improved filter structure which lasts longer under stress and resists damage due to pulsing and the like.

Figure 1:
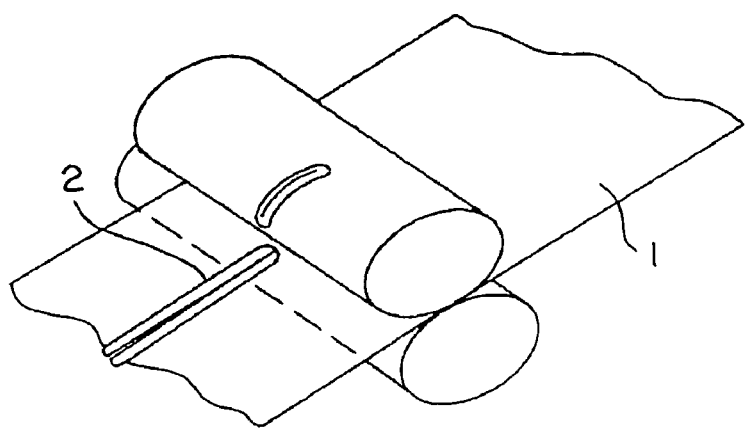
FIG. 1 illustrates a prior art material failing during deep embossment.

FIG. 1 shows a sheet 1 of conventional material, for example micro-fiberglass material, which is being embossed to a depth of 4.0 mm. As shown, when an attempt is made to emboss this material to this depth, sheet 1 fails, for example by splitting, at the point 2 of embossing, and the material is wasted.

Figure 2:
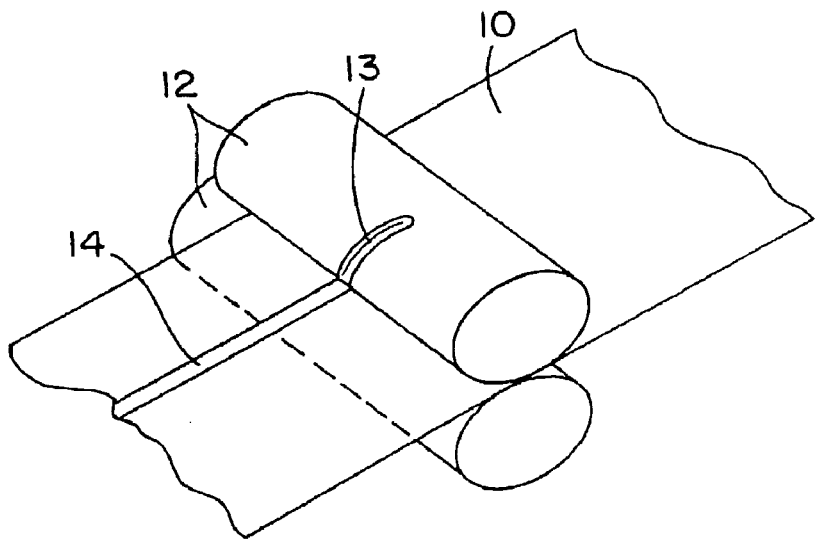
FIG. 2 illustrates a filter according to the invention having a deep embossment as desired.

According to the invention, a material has been developed for use in manufacture of filters which material allows for deeper embossing without material failure or rupture. FIG. 2 shows a similar process for embossing a sheet 10 of synthetic filter material. This material has a filtration rating selected for the desired filtration application. Preferred materials for use in accordance with the invention include hydrocarbon-based materials, preferably polypropylene, polyester and the like and blends thereof. According to the invention, sheet 10 can be embossed, for example using rollers 12 having embossing structures 13, to form an embossment 14 having a depth of at least about 1.5 mm preferably at least about 4.0 mm, and even greater than or equal to about 5.0 mm without failure of material 10 as desired, and without impacting upon the filtration qualities of the material.

The synthetic material which is useful in accordance with the invention is further characterized by a weight, which is preferably greater than or equal to about 50 g/m$^2$. Further, for structures to be formed having deeper pleats, the stiffness of the material becomes important, and the material may preferably be self supporting material for such deep pleat structures.

As shown in FIG. 2, this material can be embossed to depths exceeding 1.5 mm without rupture and such depth allows for creation of a structurally stable and reliable filter structure.

According to the invention, when subjected to the mechanical stress required to make the deep embossments as desired, the sheet material of the invention deforms as desired without failing and without losing the permeability required as this material is being used for the making of a filter through which air or some other gaseous stream must pass.

According to the invention, it may be desirable to heat the material of the present invention to a temperature of at least about the melting point of the material prior to embossing to the depths desired so as to provide the material with increased plasticity whereby the desired embossing depths of at least about 1.5 mm, preferably at least about 4.0 mm, and more preferably at least about 5.0 mm can be reached without material failure. With some low efficiency materials, the heating step may not be needed.

The deeper embossments of the present invention advantageously allow for making of a better filter with less filter material, which is desirable from a weight, cost and size standpoint.

It should be appreciated that many filter materials will require embossing using a tool having a greater profile than the desired resulting embossment. As referred to herein, the embossment depth is the resulting depth of the embossment relative to the plane of the non-embossed material.

Also, it is preferred that the synthetic filter material be hydrocarbon-based as set forth above, and that the material have a permeability to air under standard conditions (0.5 inch w.g.) of at least about 4 l/m$^2$/s.

Figure 3:
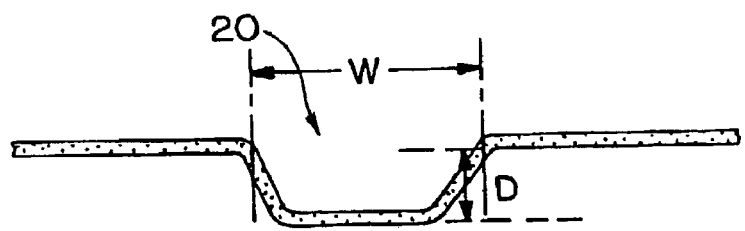
FIG. 3 further illustrates an embossment of a filter.

FIG. 3 further illustrates an embossment 20 in accordance with the invention and shows the embossment depth D and width W. The filter material for the present invention advantageously allows for forming of an embossment having a ratio of depth D to width W that is greater than or equal to about 1:10, which is both desirable and difficult to obtain using conventional filter materials due to high failure rates in the material.

It should be appreciated that the foregoing objects and advantages have been readily attained, and that the filter and method of the present invention advantageously allow for a filter structure to have embossments greater in depth and depth: width ratio than conventionally possible, as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A filter, comprising a synthetic filter material having a planar surface and having at least one embossment on the planar surface, the embossment having a depth relative to the planar surface which depth is at least about 1.5 mm and greater than the thickness of the filter material.

2. The filter of claim 1, wherein said synthetic filter material is a hydrocarbon-based material.

3. The filter of claim 1, wherein said synthetic filter material comprises a material selected from the group consisting of polypropylene, polyester and mixtures thereof.

4. The filter of claim 1, wherein said filter material has a permeability to air of at least about 4 $l/m^2/s$ at standard conditions.

5. The filter of claim 1, wherein said embossment has a depth of at least about 4.0 mm.

6. The filter of claim 1, wherein said embossment has a depth of at least about 5.0 mm.

7. The filter of claim 1, wherein said material has a weight of greater than or equal to about 50 $g/m^2$.

8. The filter of claim 1, wherein said embossment has said depth and a width, and wherein a ratio of said depth to said width is at least about 1:10.

9. A method for forming a filter, comprising the steps of:
providing a synthetic filter material having a planar surface and a thickness;
forming at least one embossment into the planar surface of said material, said embossment having a depth relative to said planar surface which is greater than the thickness of the material and at least about 1.5 mm, so as to provide an embossed synthetic material; and
forming said embossed synthetic material into said filter.

10. The method of claim 9 wherein said filter material is a hydrocarbon-based material.

11. The method of claim 9, wherein said material comprises a material selected from the group consisting of polypropylene, polyester and mixtures thereof.

12. The method of claim 9, wherein said filter material has a permeability to air of at least about 4.0 $l/m^2/s$ at standard conditions.

13. The method of claim 9, further comprising the step of heating said material to a melting point of said material prior to forming said embossment.

14. The method claim 9, wherein said embossment has a depth of at least about 4.0 mm.

15. The method of claim 9, wherein said step of forming said embossment comprises forming said embossment having a depth of at least about 5.0 mm.

16. The method of claim 9, wherein said embossed material is substantially free of ruptures at said embossment.

17. The method of claim 9, wherein said material has a weight of greater than or equal to about 50 $g/m^2$.

18. The method of claim 9, wherein said embossment has said depth and a width, and wherein a ratio of said depth to said width is at least about 1:10.

* * * * *